United States Patent [19]

Shellhammer et al.

[11] Patent Number: 5,444,231
[45] Date of Patent: Aug. 22, 1995

[54] BAR CODE SCAN STITCHING

[75] Inventors: Stephen J. Shellhammer, Bayport; Emanuel Marom, Stony Brook, both of N.Y.

[73] Assignee: Symbol Technologies, Inc., Bohemia, N.Y.

[21] Appl. No.: 375,182

[22] Filed: Jan. 18, 1995

Related U.S. Application Data

[63] Continuation of Ser. No. 912,558, Jul. 13, 1992, abandoned.

[51] Int. Cl.⁶ .................................................. G06F 7/10
[52] U.S. Cl. ....................................... 235/462; 235/463; 235/467; 235/472
[58] Field of Search ................ 235/462, 463, 467, 472

[56] References Cited

U.S. PATENT DOCUMENTS

| | | | |
|---|---|---|---|
| 4,251,798 | 2/1981 | Swartz et al. | |
| 4,329,574 | 5/1982 | Jordan, Jr. | 235/463 |
| 4,369,361 | 1/1983 | Swartz et al. | 235/470 |
| 4,387,297 | 6/1983 | Swartz et al. | 235/462 |
| 4,409,470 | 10/1983 | Shepard et al. | 235/472 |
| 4,488,678 | 12/1984 | Hara et al. | 235/463 |
| 4,717,818 | 1/1988 | Brookman et al. | 235/462 |
| 4,760,248 | 7/1988 | Swartz et al. | 235/472 |
| 4,896,026 | 1/1990 | Krichever et al. | 235/472 |
| 4,916,297 | 4/1990 | Tukada et al. | 235/462 |
| 4,973,829 | 11/1990 | Ishida et al. | 235/462 |
| 5,028,772 | 7/1991 | Lapinski | 235/467 |
| 5,045,677 | 9/1991 | Okamura | 235/462 |
| 5,059,779 | 10/1991 | Krichever et al. | 235/467 |
| 5,124,538 | 6/1992 | Lapinski et al. | 235/467 |
| 5,155,344 | 10/1992 | Fardeau | 235/467 |
| 5,194,722 | 3/1993 | Mergenthayer | 235/467 |

*Primary Examiner*—Harold Pitts
*Attorney, Agent, or Firm*—Fish & Richardson

[57] ABSTRACT

Combining scan fragments of a bar code symbol. Each fragment is represented by a series of values, with each value representing the width of an element in the fragment. The alignment at which the fragments are combined is determined by shifting the alignment of the fragments over a range of positions, and determining for each position an index of the overall degree of similarity between the aligned values of the two fragments at that position. The fragments are combined at an alignment that produces a relatively larger index value (e.g., that maximizes the index). The index of overall similarity may be a correlation factor representing the degree of correlation, at each tested alignment, between the series of values representing each fragment. The index of overall similarity may alternately be the number of consecutive matching elements. At each position, the values in each series are compared and the number of consecutive values that match within a preselected tolerance is determined.

23 Claims, 6 Drawing Sheets

BAR CODE SCAN STITCHING

This is a continuation of application Ser. No. 07/912,558 filed Jul. 13, 1992, now abandoned.

BACKGROUND OF THE INVENTION

This invention relates to bar code scanning, and in particular to techniques for combining, or stitching, partial scans.

A bar code symbol is a coded pattern of indicia comprising a series of bars and spaces having different light reflecting characteristics. Bar code scanning systems electro-optically transform the indicia into electrical signals, which are decoded into alphanumerical characters. Characters are typically represented in digital form and are provided as an input to a data processing system for applications, such as point-of-sale processing and inventory control. Scanning systems of this general type have been disclosed, for example, in U.S. Pat. Nos. 4,251,798; 4,369,361; 4,387,297; 4,409,470; 4,760,248; and 4,896,026, all of which have been assigned to the same assignee as the instant application.

Bar code symbols are formed from a series of bars and spaces, called elements, which are typically rectangular in shape and have a variety of possible widths. The specific arrangement of elements defines the character represented according to a set of rules and definitions. To encode a desired sequence of characters, groups of elements are concatenated to form a bar code symbol, with each character of the message represented by a corresponding group of elements. In some symbologies a "start" and "stop" character is used to indicate where the bar code begins and ends. There are a number of symbologies in use, e.g., UPC/EAN, Code 39, Code 128, Codabar, and Interleaved 2 of 5.

In typical scanning systems, a light source, such as a laser or laser diode, produces a beam which is directed by a lens or similar optical components along a light path toward a target that includes a bar code symbol on the surface. The beam produces a spot on the target. To scan with a laser system, the spot may be moved with an oscillating motor to produce a line or series of lines across the symbol. A portion of the light that is reflected off the symbol is detected by a sensor which may be positioned in the scanner. The sensor converts the reflected light into an electrical signal which is converted to a digital representation by electronic circuitry. For example, an analog electrical signal from the photodetector may be converted into a pulse width modulated digital signal, with pulse widths corresponding to the physical widths of the bars and spaces.

The decoder receives the pulse width modulated digital signal from the scanner, and attempts to decode the scan. If the start and stop characters and all of the characters between them are decoded successfully, the decoding process is finished. Otherwise, the decoder receives a next scan and attempts to decode it. Each attempt is based on the signal received during a single scan. The process continues until a scan is completely decoded or until no more scans are available.

A scan line or series of scan lines may not always entirely cross the bar code symbol. For example, a scanner may be in a fixed position next to a conveyor with containers, each of which has a bar code symbol printed on a label. If the label is skewed with respect to the scan line, there may be no single scan line which includes both the start and stop characters. These incomplete scan lines, called fragments, were discarded until techniques were developed to stitch or combine the fragments together, so that the decoding process can be completed.

Several basic techniques have been employed to combined fragments. One technique, known as block decoding, involves combining predefined regions or blocks in a number of scans. For example, a symbology such as UPC has start, stop, and center characters. If one fragment includes a start and a center, and another fragment includes a center and stop, these two "blocks" can be combined to form a complete scan.

In another method, a system checks fragments for corresponding portions, and stitches by superimposing. For example, the widths of elements can be measured in clock pulses for two fragments. These widths may be converted to a binary representation of widths or of ratios of widths between successive elements. The pulse count or other representation of the width of an element in one scan is compared to the width of an element in another scan. If these are the same or sufficiently similar, adjacent elements are compared. If a group of elements of a certain length are the same, the two groups of elements are considered to be corresponding, and the two fragments are stitched by superimposing the common portions.

SUMMARY OF THE INVENTION

In general the invention features combining scan fragments of a bar code symbol. Each fragment is represented by a series of values, with each value representing the width of an element in the fragment. The alignment at which the fragments are combined is determined by shifting the alignment of the fragments over a range of positions, and determining for each position an index of the overall degree of similarity between the aligned values of the two fragments at that position. The fragments are combined at an alignment that produces a relatively larger index value (e.g., that maximizes the index).

In some preferred embodiments, the index of overall similarity is a correlation factor representing the degree of correlation, at each tested alignment, between the series of values representing each fragment. Preferably, the correlation factor is based on the sum of the products of the difference between the values and the mean value. The alignment achieving the maximum correlation factor is selected for combining the fragments.

In other preferred embodiments, the index of overall similarity is the number of consecutive matching elements. At each position, the values in each series are compared and the number of consecutive values that match within a preselected tolerance is determined. The fragments are combined at the alignment producing the largest number of consecutive matching values. Preferably, the series of consecutive matching values must include the last successfully decoded character.

In another aspect, the invention features a two-stage alignment process for choosing the alignment at which to combine fragments. An initial alignment is selected by assuming that the scan producing the newest fragment is offset relative to the previous scan by approximately the same distance that the previous scan was offset from the scan before it. In preferred embodiments, the offset is determined from the elapsed times required for scans to reach corresponding reference elements in the bar code symbol. After the initial alignment has been set, a fine adjustment of alignment is made using one of the techniques described above. Preferably, the range of positions over which alignment is tested during fine adjustment is limited to less than a character in each direction (preferably less than about one-half character).

In another aspect, the invention features a method for checking the reliability of the stitched scans. After each fragment is combined, the combined fragment is decoded and compared to the previous decoded fragment. A different reliability factor may be associated with each character, with each factor being incremented or decremented depending on whether the character is decoded the same or differently following each fragment stitching. At the conclusion of stitching, a decision is made whether to accept the stitched bar code scan based on the values of the reliability factors. By decoding as the stitching progresses, rather than waiting until stitching is completed, a better measure of the reliability of the final stitched scan is obtained.

As the invention is able to stitch fragments without requiring a perfect match, stitching can occur even if one of the elements has not been correctly scanned in a fragment. As long as the fragment is aligned in the correct position, and other scans correctly read the element, such an error can be overcome.

In yet another aspect, the invention features a method for scanning a bar code that is longer than the scan line provided by the bar code scanner. In such a case, which may occur with a hand-held scanner, the bar code is panned from one end to the other, and the fragments are combined. In some cases, this method is better than the alternative of moving the scanner farther from the bar code symbol, if that is even possible, because if the scanner is moved too far from the bar code, distortion prevents accurate scanning.

Other features and advantages will become apparent from the following description of preferred embodiments and from the claims.

DESCRIPTION OF THE PREFERRED EMBODIMENTS

Figure 1:
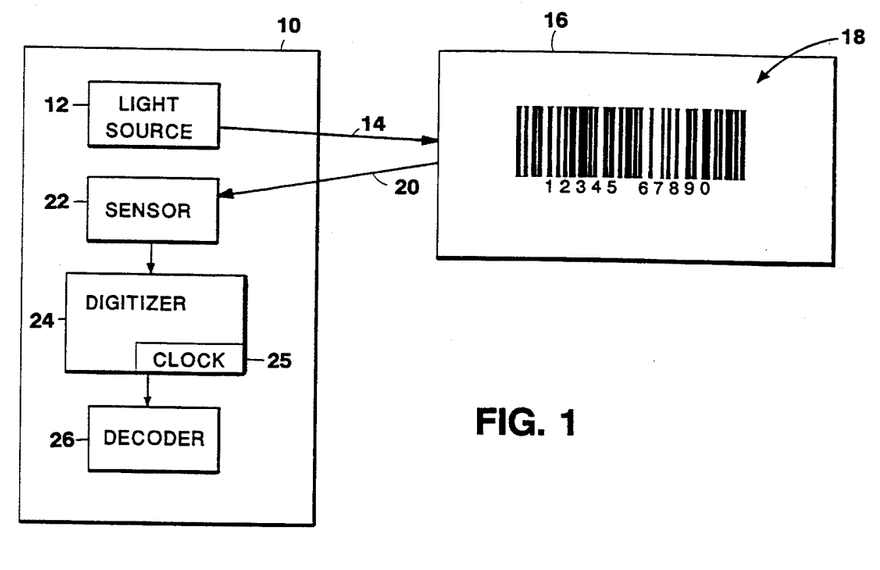
FIG. 1 is a block diagram of a scanning system.

Referring to FIG. 1, scanning system 10 is used to read and interpret bar code symbols. Light source 12 directs a beam of light 14 at bar code 18 which is printed or affixed on target 16. Bar code symbol 18 produces a reflected beam 20 which is received by sensor 22. The sensor produces an analog signal which indicates how much light is received from the reflected beam as the beam scans the bar code. The analog signal is digitized by digitizer 24, and the resulting digital signal is sent to a decoder 26. The digital signal consists of a series of pulse width values, each representative of the time it took for the scan to cross an element. The time is determined by clock 25 which counts cycles beginning on a leading or falling edge of the digital signal. A representation of the time that each element is scanned is stored so that a set of discrete integers represents the pulse widths of elements in the time domain. Decoder 26 tries to convert the digital signal to a series of alphanumeric characters.

Figure 2:
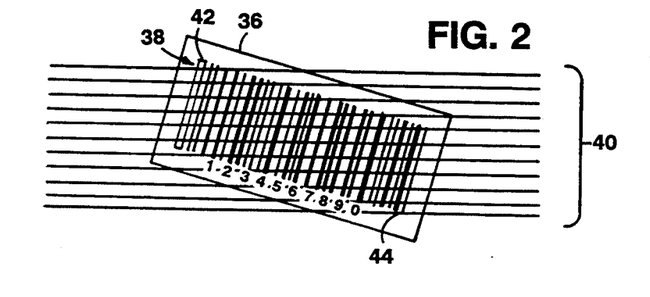
FIGS. 2 and 3 are pictorial representations of bar codes and scan fragments.

In some cases, the bar code cannot be completely read with a single scan line. Referring to FIG. 2, bar code symbol 38 is printed on label 36. The symbol includes data characters, a start character 42, and a stop character 44. Scan lines 40 are horizontal, but the label is skewed so that no single scan line passes through both start character 42 and stop character 44. Scan lines 40 are therefore all fragments. While no scan has all the elements, each element can be determined from at least one scan line.

Figure 3:
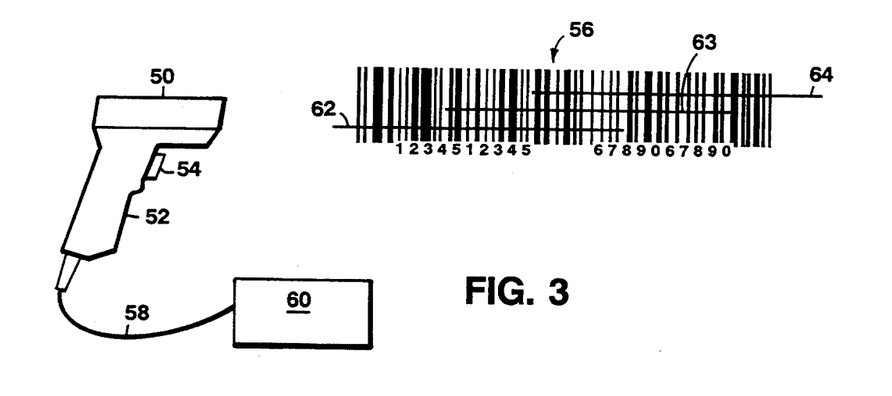

Another example of how fragments are obtained is shown in FIG. 3. A relatively long bar code symbol 56 is scanned by hand-held scan gun 50 which has a light source and a detector. A user initiates scanning with a trigger 54 next to a handgrip 52. Data is sent over cable 58 to a host device 60, such as a small computer (or to a portable data collector). Neither fragment 62, 63, nor 64 completely crosses the bar code, but combined, the three cross every element. If a scan line is shorter than the bar code, the user may be able to move the scanner away from the code to make the scan line longer. But a user can only move a scanner away from the target a certain distance before the bar code symbol is outside the depth of field of the scanner, and the symbol cannot be scanned properly. Instead, a user can pan the bar code with scan gun 50. Panning a one-dimensional bar code in the direction of the code, i.e. so that the scan line is perpendicular to the height of the elements, produces a series of fragments 62–64 which can be stitched to decode the entire scan.

Figures 4, 6:
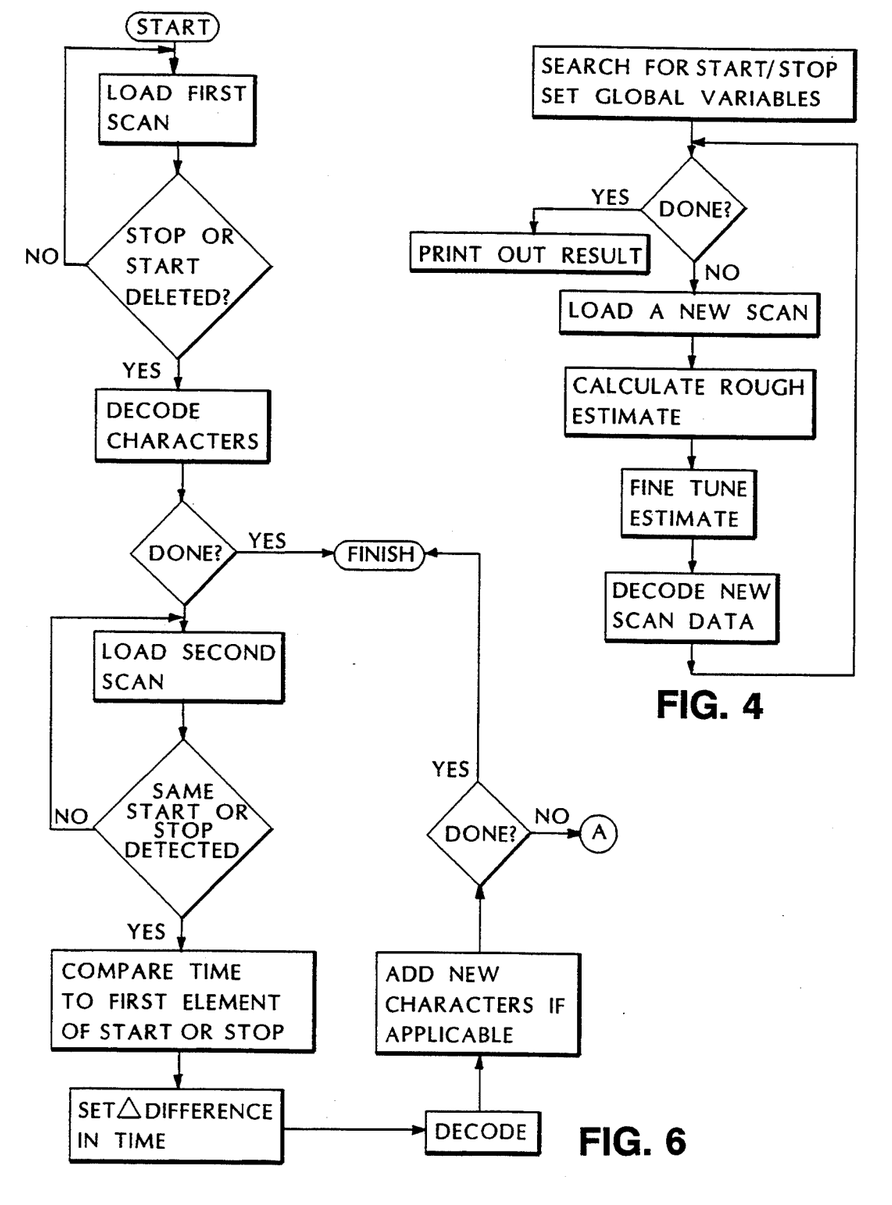
FIGS. 4, 6, 7, 8, 11, and 12 are flow charts of preferred embodiments.

If there are two fragments, the decoder determines which elements in one fragment correspond to elements in the other, so that it can stitch the fragments together. Referring to FIG. 4, a general method for combining or stitching scans begins with searching for a start or stop character, and setting global variables, such as length of current scan, and a flag to indicate whether the start or stop was detected. If the start and stop are both detected and the data characters can be decoded, the decoding is finished and provides a result. If not, a new scan is loaded. First, an initial estimate is made of the correct alignment of the fragments. This is followed by a fine adjustment of alignment, which begins at the estimated alignment. After the fine adjustment indicates the best alignment of the fragments, the fragments are stitched and the stitched scan is decoded. This process is repeated until all the data characters are decoded, or until the decoder determines that a complete scan is impossible.

Figure 5:
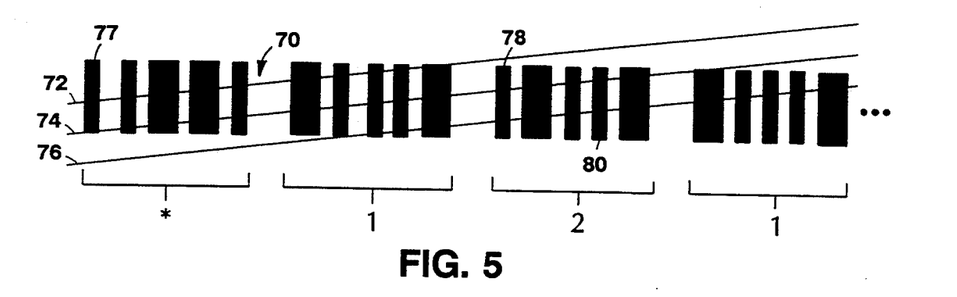
FIG. 5 is a pictorial representation of a portion of a bar code symbol.

Referring to FIG. 5, there is shown the first four characters of a bar code in the Code 39 symbology. A Code 39 character has nine elements, five bars and four spaces, each of which is either narrow or wide. Of the nine elements, three are wide and six are narrow. A Code 39 symbol starts and stops with an asterisk, and can be scanned and read in either direction. Between each character is an intercharacter space 70 which can be set to some selected width.

Referring to FIG. 6 in conjunction with FIG. 5, the decoder loads a first scan, and determines whether a start or stop is detected. If not, the decoder loads further scans, until such a character is detected. For scan 72, the asterisk start/stop character is detected, so the decoder attempts to decode the characters by loading nine elements at a time, and checking whether these elements represent a valid character. The decoder would load the next nine elements after the asterisk, and successfully decode a numeral "1". But when attempting to decode the next nine elements, the decoder would fail, as it would encounter fewer than nine elements. Only if the scan line includes a start and stop, and if all the data characters between the start and stop are decoded into valid characters, is the decoding completed.

Because the entire bar code could not be scanned, a second scan 74 is loaded. For the second scan, the decoder checks for the same start or stop character found in the first scan 72. If the start character is not found, another scan (i.e., scan 76) is loaded until it is found. For the first two scans, the same start or stop is used to initialize the decoding process and to set the initial delay. When subsequent scans are loaded, it is not necessary to find the start or stop character.

As noted above, clock cycles are counted during the scan, so the elapsed time for the scan to reach a particular element is known. The decoder selects the first element 77 of the start character as a reference element for the first two scans, and sets a parameter, $\Delta$, equal to the difference between the elapsed time from the start of each scan to the first element 77. The second scan is decoded, and any new characters that are decoded are added to the successfully decoded string of characters from the previous scan. For scan 74, the second data character, a numeral "2", would be added to the numeral "1" previously decoded.

Figures 7, 8, 10:
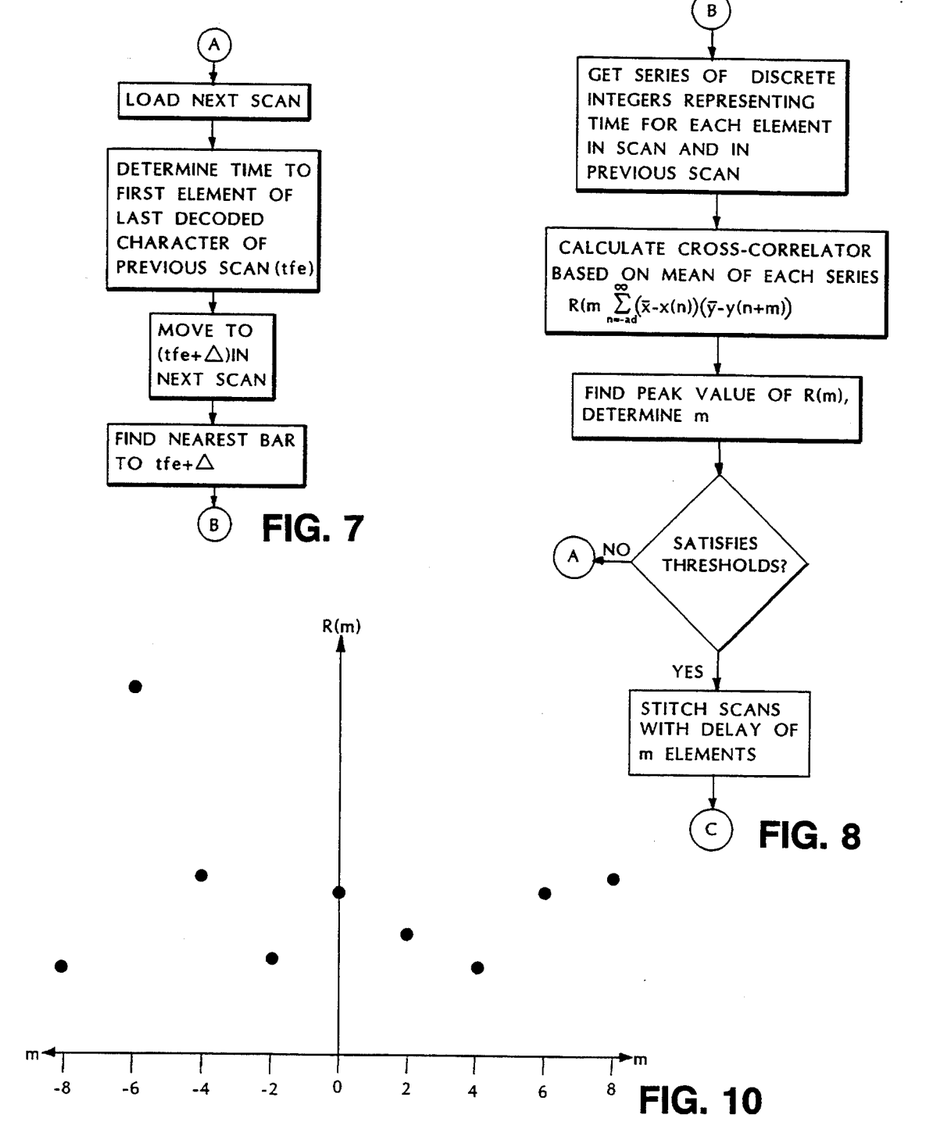
FIG. 10 is a graph of a correlation with respect to element delays for the bar code fragments of FIGS. 9 and 13.
Figure 9:
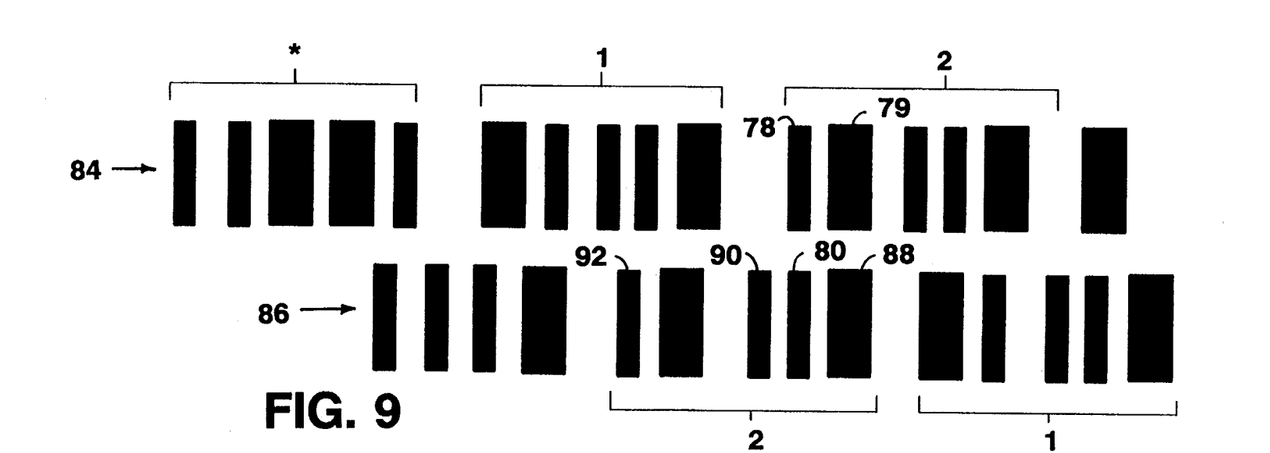
FIGS. 9 and 13 are pictorial representations of bar code fragments.

Referring to FIG. 7, scan 76 is loaded, and a rough estimate is made of the proper alignment of scan 76 and previous scan 74. To make the rough estimate, the decoder uses the time measurements to determine the elapsed time to the first element of the last decoded character in previous scan 74. In FIG. 5, element 78 is the first element of the last character decoded by scan 74. The elapsed time for scan 76 to reach this element is added to $\Delta$, as it is assumed that scan 76 is offset from scan 74 by about the same amount of time as scan 74 was offset from scan 72. The decoder finds the nearest bar 80 which is that distance in time from the beginning of scan 76. FIG. 9 shows the corresponding bar code fragments 84, 86 resulting from scans 74, 76. In FIG. 9 the fragments are aligned at the rough estimate alignment in which bar 78 is aligned with bar 80. Bar 80 is, in fact, several elements away from bar 78. Such inaccuracies in initial alignment could result from intrascan variation in scan velocity.

After the rough estimate of alignment is made, the decoder does a fine adjustment of alignment. In one embodiment, the decoder uses a correlation method (FIG. 8). The decoder gets the discrete values for each element in the new scan, and performs a correlation between these values and the values from the previous scan. The decoder correlates by summing the product of the difference between the values and the mean of the values over the entire range of elements. Alternatively, the number of elements which are correlated can be limited to a certain range to reduce calculations and to reduce the possibility that the results are corrupted by extraneous printing along the top and bottom of the bar code symbol (see, e.g., the numbers printed under the bar code symbol in FIG. 2). This correlation is performed over a series of elemental shifts (values of parameter m), i.e., the elements are shifted in increments of two elements over a range from $-i$ to $i$. The range could be over the entire extent of the bar code, or alternatively, the decoder could assume that the rough estimate found a bar which is not too far from the first element of the last decoded character. If this assumption is true, the range can be confined to a narrower range, e.g., about one-half character in either direction, so the range parameter, i, could be set to about six for a Code 39 symbol, as there are nine elements in each Code 39 character.

Figure 13:
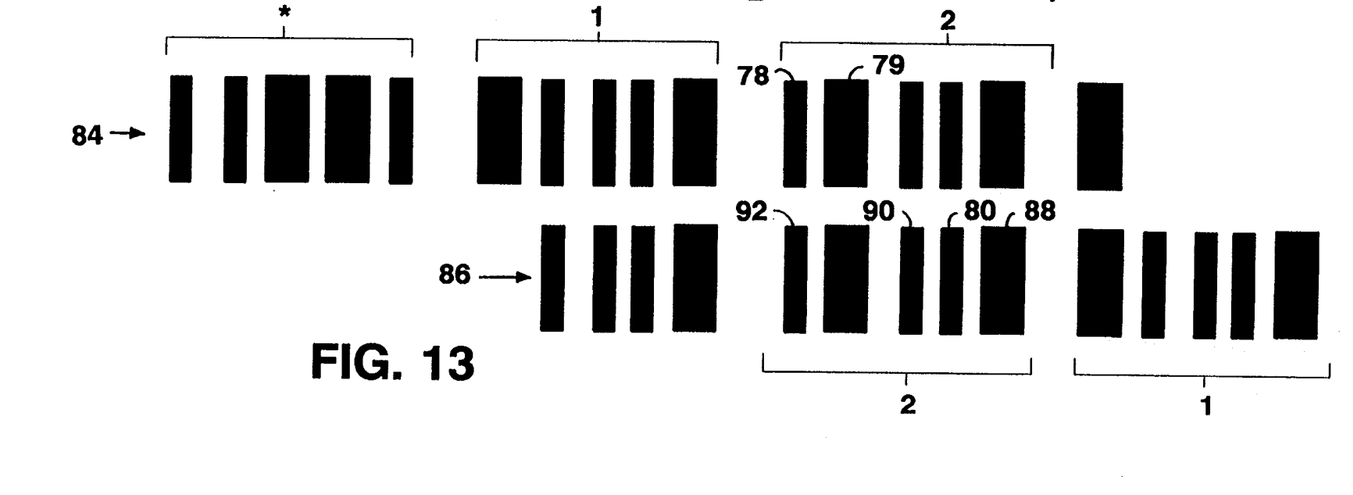

Referring again to FIG. 9, at m=0 (where m is the number of elemental shifts), bar 78 is aligned with bar 80. Shifting by two, at m=2, bar 78 is aligned with bar 88; at m=−2, bar 90 is aligned with bar 78. The value of m which produces the greatest correlation is selected as the correct alignment. At m=−6, the correlation is the greatest, and thus this is chosen as the alignment of fragments 84 and 86. FIG. 13 shows the chosen alignment (corresponding to m=−6). Referring to FIG. 10, the graph of R(m), the correlation factor as a function of m, is at a maximum where m=−6. The decoder checks the correlation factor values to ensure that this maximum point satisfies certain thresholds, e.g., that it is sufficiently greater than other points in R(m). If the thresholds are met, fragments 84 and 86 are stitched together at that alignment.

Figures 11, 12:
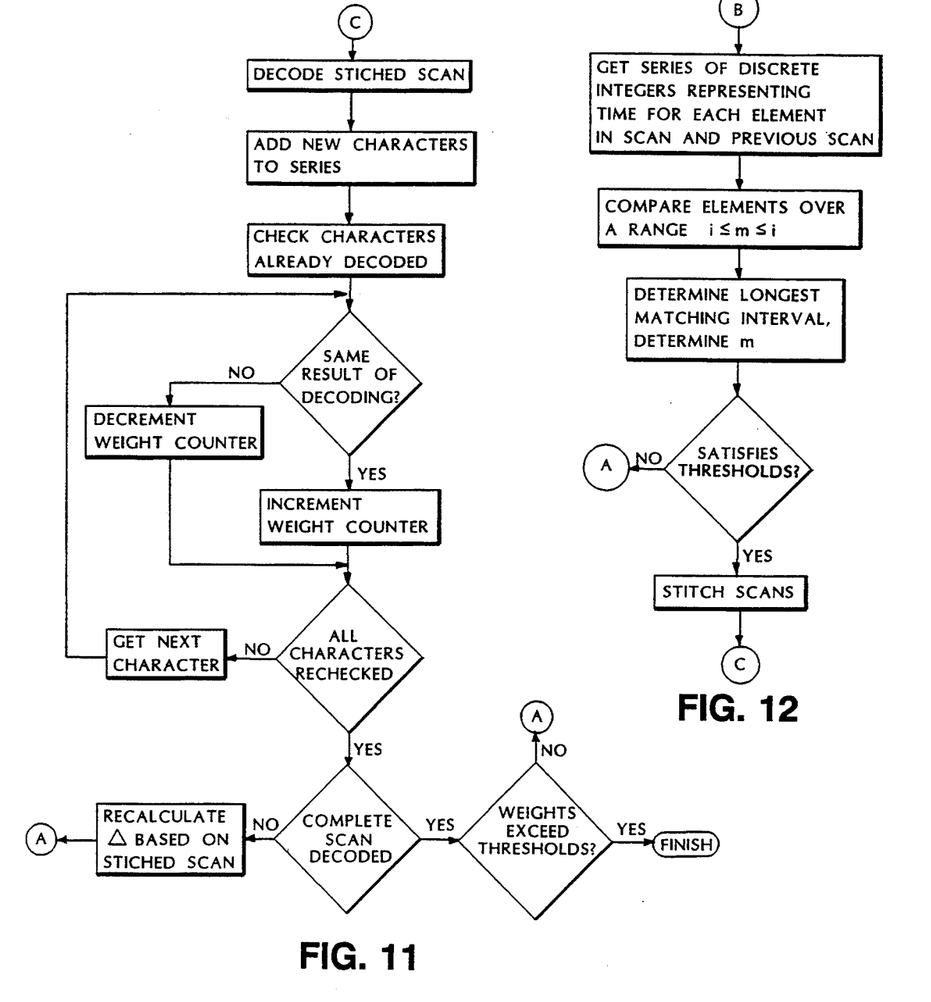

Referring to FIG. 11, the decoder attempts to decode each character in the new stitched scan. Any characters which are decoded for the first time are concatenated with the series of characters that have already been decoded. Characters that have previously been decoded are rechecked. If the decoder determines that the same character is decoded with the same result, a weight factor for the character is incremented to indicate greater reliability. If a previously decoded character is decoded in the new scan with a different result, the weight factor is decremented. At the conclusion of decoding, the weight factors for each character are checked against thresholds to insure sufficient reliability. If the weights are insufficient, another scan is obtained. Because it is assumed that successive scans are fairly close together, each character is typically scanned a number of times. Therefore, even though each fragment does not include all characters, each character is scanned a number of times for a weight threshold to be established.

If the scan is not completely decoded, the time delay, $\Delta$, is recalculated based on the results of the fine adjustment procedure. It had been assumed in making the initial, or rough, estimate that element 78 and bar 80 had the same delay. Because, in fact, the time for the scans to reach element 78 and bar 92 should have been the same time, the difference between these times is used in making the rough estimate when a next scan is loaded.

In another embodiment (FIG. 12), a different index of overall similarity of the fragments is used. Instead of using correlation factor as the index of overall similarity, the number of consecutive matching pulse-width values is used as the index. Elements in scan 76 are compared with elements in scan 74, for a range of shifted positions, and a determination is made of the number of consecutive matching values (i.e., values that are within a preselected variation from one another) at each shifted position. For example, a narrow element should be scanned in about ten clock cycles and a wide element in twenty, and a decision on whether two elements match could be made by first deciding whether an element is narrow or wide (e.g., using rules that a narrow element can have a range of seven to thirteen cycles, and a wide element a range of sixteen to twenty-four cycles), and then requiring exact matching (narrow to narrow, and wide to wide). Alternatively, matching could be based on whether the width of an element in one fragment is within some preselected fraction of the width of the element in the other fragment. Referring again to FIG. 9, there is a match of at least two elements when $m=0$, 78 and 79 in fragment 84 with 80 and 88 in fragment 86. When $m=-6$, the number of consecutive matching elements should be greatest. The decoder checks thresholds to insure that the longest interval is long enough, and long relative to other values of m. (The range of m can be set in advance to cover, for example, a whole character or a half-character on either side of $m=0$.) If the thresholds are satisfied, the scan is stitched.

The correlation method and the longest matching interval method are intended to find the best alignment, but the elements may not necessarily have perfect correspondence. If the same element is decoded several times and weights are used, the element may be incorrectly read in one scan, yet still be properly aligned and successfully decoded by other scans.

Software for implementing the invention is attached as a microfiche appendix. Section I of the appendix gives pseudocode for implementing the invention using the longest matching interval technique (FIG. 12). Section II includes just the sections of pseudocode that would be different if the implementation used the correlation technique (FIG. 8).

Other embodiments are within the following claims.

While panning a long bar code was discussed with reference to a hand-held gun, panning could also be done with other scanning systems, such as a fixed laser scanner. A bar code which is longer than the scan line may be affixed on a product which is mechanically or manually moved past the scanner in substantially the same direction as the scans.

What is claimed is:

1. A method for combining scan fragments of a bar code symbol composed of a plurality of bar code elements, said scan fragments comprising a series of digitized values each representing the width of one element of the bar code symbol, said method comprising the steps of:

receiving a first series of values for a first fragment;
receiving a second series of values for a second fragment;
selecting an alignment between the first and second series of values at which at least portions of the first and second series of values correspond to the same bar code elements, said selecting an alignment comprising the steps of
shifting the alignment between the first and second series of values over a predetermined range of shifted positions,
performing a comparison of at least a portion of the values of said first series to aligned values of said second series at each of said shifted positions in said predetermined range of shifted positions,
determining for each of said shifted positions in said predetermined range of shifted positions an index of the overall degree of similarity between the values of said first and second series, and
choosing as said alignment a shifted position from said predetermined range of shifted positions for which said index is relatively larger than for other shifted positions; and
combining said first fragment and said second fragment using said alignment, thereby forming a combined fragment.

2. The method of claim 1 wherein said step of determining an index comprises performing a correlation between values of said first series and values of said second series to provide a correlation factor as said index.

3. The method of claim 2 wherein said performing said correlation comprises summing the products of values of said first series and values of said second series.

4. The method of claim 1 wherein said step of performing a comparison comprises comparing values in the first series and values in the second series to determine the number of consecutive values in the first and second series that are within a predetermined tolerance, and wherein said index is said number of consecutive values.

5. The method of claim 4 wherein, prior to said step of performing a comparison, said first fragment is decoded to determine a string of decoded characters, and wherein said consecutive values include the values corresponding to the last decoded character of said string of decoded characters.

6. The method of claim 1, 2, or 4 wherein said choosing step comprises choosing the shifted position that maximizes said index.

7. The method of claim 1 wherein said steps are repeated using said combined fragment as said first fragment and a new fragment as said second fragment.

8. The method of claim 1 further comprising, after said combining step, decoding said combined fragment to form a string of combined decoded characters.

9. The method of claim 8 further comprising decoding said first fragment to form a string of first decoded characters.

10. The method of claim 9 further comprising:
comparing said first decoded characters and said combined decoded characters; and
adjusting a factor which indicates whether a first decoded character is the same as the corresponding combined decoded character.

11. A method for combining fragments of a bar code symbol, said bar code symbol composed of a plurality of characters, each composed of a plurality of bar code elements, said method comprising:
receiving a first series of values for a first fragment and a second series of values for a second fragment of said bar code symbol;
decoding said first fragment values to produce a first set of decoded characters;
combining said first fragment values and said second fragment values to form combined fragment values;
decoding said combined fragment values to produce a second set of decoded characters;
comparing said first set of decoded characters and said second set of decoded characters to determine a degree of similarity; and
adjusting at least one reliability parameter in accordance with the degree of similarity.

12. The method of claim 11 wherein a single reliability parameter is adjusted based on whether each character in said first set is the same as the corresponding character in the second set.

13. The method of claim 11 wherein there are a plurality of reliability parameters, one corresponding to each character.

14. The method of claim 13 wherein each of said plurality of reliability parameters is
- incremented if the corresponding character is decoded to produce the same character in the first set and the second set;
- decremented if the corresponding character is decoded to produce a different character in the first set and the second set; and
- maintained without change if the corresponding character is decoded in one of said first and second set, and not in the other of said first and second set.

15. The method of claim 11, 12, or 13 further comprising, after characters in the bar code have been successfully decoded, checking said reliability parameter to determine if it exceeds a threshold value.

16. A method for combining scan fragments of a bar code symbol composed of a plurality of characters, each character composed of a plurality of bar code elements, said method comprising:
- receiving a first fragment and a second fragment of said bar code symbol;
- shifting said second fragment relative to said first fragment by a distance that achieves an alignment of said first and second fragments;
- combining said first and second fragments at said alignment to form a combined fragment;
- receiving a third fragment;
- initially shifting said third fragment with respect to said combined fragment by said distance; and
- continuing to shift said third fragment relative to said combined fragment to finely adjust the alignment of third and combined fragments.

17. The method of claim 16 wherein said distance is determined based on the distance between corresponding reference elements in said fragments.

18. The method of claim 16 wherein said continuing to shift said third fragment relative to said combined fragment comprises shifting in either direction a maximum of the number of elements that form a character.

19. The method of claim 18 wherein the maximum shifting in each direction is approximately one-half the number of elements in a character.

20. The method of claim 16 wherein said scan fragments comprise a series of digitized values each representing the width of one element of the bar code symbol; wherein there are received a first series of values for said combined fragment and a second series of values for said third fragment; and wherein said step of continuing to shift said third fragment comprises the steps of
- shifting the alignment between the first and second series of values over a range of shifted positions,
- performing a comparison of at least a portion of the values of said first series to aligned values of said second series at each of said shifted positions,
- determining for each of said shifted positions an index of the overall degree of similarity between the values of said first and second series, and
- choosing as said alignment a shifted position for which said index is relatively larger than for other shifted positions.

21. The method of claim 20 wherein said step of determining an index comprises performing a correlation between values of said first series and values of said second series to provide a correlation factor as said index.

22. The method of claim 20 wherein said step of performing a comparison comprises comparing values in the first series and values in the second series to determine the number of consecutive values in the first and second series that are within a predetermined tolerance, and wherein said index is said number of consecutive values.

23. The method of claim 1 further comprising, before said shifting step,
- determining a rough alignment between the first series of values and the second series of values based on a time measurement.

* * * * *